United States Patent
VanDenberg

(10) Patent No.: US 6,769,703 B1
(45) Date of Patent: Aug. 3, 2004

(54) AIR BLADDER SUSPENSION SYSTEM

(75) Inventor: Ervin VanDenberg, Massillon, OH (US)

(73) Assignee: Meritor Heavy Vehicle Suspension Systems, LLC, Troy, MI (US)

(*) Notice: Subject to any disclaimer, the term of this patent is extended or adjusted under 35 U.S.C. 154(b) by 274 days.

(21) Appl. No.: 09/578,072

(22) Filed: May 23, 2000

(Under 37 CFR 1.47)

(51) Int. Cl.[7] .......................... B60G 9/02; B60G 11/27; B60G 11/28
(52) U.S. Cl. ...................... 280/124.116; 280/124.157; 267/256
(58) Field of Search ................... 280/124.116, 124.128, 280/124.157, 678, 683, 86.5; 267/256

(56) References Cited

U.S. PATENT DOCUMENTS

| | | | | | |
|---|---|---|---|---|---|
| 2,317,057 A | * | 4/1943 | Higby | ......................... | 267/256 |
| 2,606,019 A | * | 8/1952 | Smith et al. | ................. | 267/256 |
| 2,859,047 A | * | 11/1958 | Easton | ................ | 280/124.116 |
| 3,000,651 A | * | 9/1961 | Gouirand | ............. | 280/124.157 |
| 3,073,621 A | * | 1/1963 | Wedzinga | ............. | 280/124.116 |
| 3,140,083 A | * | 7/1964 | Paul | ........................... | 267/256 |
| 3,692,325 A | * | 9/1972 | Gouirand | .................... | 280/678 |
| 3,822,908 A | * | 7/1974 | Gouirand | ............. | 280/124.157 |
| 5,746,441 A | * | 5/1998 | VanDenberg | ........ | 280/124.116 |

* cited by examiner

Primary Examiner—Peter C. English
(74) Attorney, Agent, or Firm—Carlson, Gaskey & Olds

(57) ABSTRACT

A vehicle suspension system having a central beam pivotally mounted to hanger brackets at one end and rigidly attached to an axle at another end along substantially the entire length of the axle. The hanger brackets being mounted to the vehicle frame. The vehicle suspension system further including an air spring positioned intermediate the central beam and the vehicle frame. The air spring is fastened with fasteners to a support plate attached to the vehicle frame. The fasteners extend into the air spring. The air spring may also be fastened with similar fasteners to the central beam. A supplemental support plate may also be provided inside of the air spring for sandwiching the air spring between the supplemental support plate and the support plate and/or the supplemental support plate and the central beam. One or more of the fasteners may be an air inlet/outlet.

2 Claims, 6 Drawing Sheets

AIR BLADDER SUSPENSION SYSTEM

BACKGROUND OF THE INVENTION

1. Technical Field

The invention relates generally to an improved suspension system for land vehicles. More particularly, the invention relates to trailing or leading beam air suspension systems. Specifically, the invention relates to trailing or leading beam air suspension systems having one air bladder per axle longitudinally aligned with its respective axle and being fastened to the vehicle frame and its respective axle or connecting beam.

2. Background Information

With the advent following World War II of large load carrying capacity trucks and trailers in this country, came the need to provide vehicles with multiple axles for increasing the capacity of trucks over that of previously existing designs. These large loads could not be carried by the then existing technology generally comprising one rear axle supporting the majority of the load on the trailer.

While the use of additional axles effectively increased load-carrying capacity, it was soon realized that as the number of load bearing axles increased on a given vehicle, a number of difficulties arose. Specifically, tire scuffing, loss in fuel economy, and the inability to safely corner, all were problems associated with multiple axle vehicles. These problems were in addition to the standard problems associated with load bearing axles such as the providing of sufficient strength to resist lateral and axial deflection. In the case of one or multiple axles, many factors account for the various current and past suspension designs as the mitigation of these problems was a primary concern to the industry resulting in the development of a variety of suspension systems, both liftable and non-liftable.

Liftable suspensions could be selectively raised from the road surface or lowered into engagement with the road surface when needed, thereby mitigating a number of the aforementioned problems. However, these liftable suspensions added significant weight to the suspension system, and required additional parts such as lifting apparatus which complicated the suspension system, all of which lowered load carrying capacity and increased the complexity and costs of servicing the system.

Alternativley, non-liftable axles have been designed for a variety of purposes as many vehicles continuously or almost continuously require additional load-carrying capacity and thus require auxiliary suspension system. Examples of such vehicles requiring auxiliary suspensions include trash compactor trucks, concrete mixing and delivery vehicles. These trucks require additional suspensions as the truck has a relatively large weight when compared to the overall vehicle length.

As is well known in the art, suspension systems may take a variety of forms, including parallelogram suspensions, and leading and trailing beam-type suspensions. All of these systems have become complicated and heavy to account for or attempt to account for a variety of problems such as those indicated above. The need thus exists for a suspension system which is simple, lightweight, safe, and provides adequate vertical load-carrying characteristics. Additionally, the need exists for a suspension system which provides an axle to beam connection which is lightweight, easy to assemble, and simple to manufacture.

As trucks continue to carry additional weight, it is necessary to provide a method of supporting the vertical load associated with the trailer without unduly increasing the weight and cost associated with the suspension system. In the past, such vertical load has been taken up with the use of air springs positioned between the leading or trailing beam, or parallelogram suspension system and the vehicle frame. While the use of air springs is presumably adequate for the purpose for which it is intended, the use of such air springs create a number of drawbacks. Most notably, such air springs are relatively expensive, and as the vehicle is required to carry more load, the size of the air spring must correspondingly increase. Additionally, the air spring operates through a relatively small area such that the force of the air spring over any given square unit is relatively large. Lastly, these air springs, due to the relatively high force acting on the spring itself, must be mounted with complicated mounting means such as bolts and pins.

The need thus exists for an air suspension which will allow the air spring to operate over a much larger area thereby significantly reducing maximum loads on the air spring, and which, as a result of the reduced force on the air spring, may be attached by more convenient methods.

SUMMARY OF THE INVENTION

Objectives of the invention include providing a vehicle suspension system which is of a more simplistic construction, lightweight, more cost effective to manufacture, easy to assemble and maintain, and simple to manufacture.

Another objective is to provide a suspension system which provides an improved ride.

Still another objective is to provide a suspension system which provides adequate vertical load carrying characteristics with an improved, cost effective, and simple design.

Yet another objective is to provide an improved air spring for use with a suspension system where the air spring is simplistically and economically attached to both the vehicle frame and the axle or beam.

Still another objective is to provide a vehicle suspension system where the vertical load acting on the air spring is significantly reduced.

Yet another objective is to provide an improved suspension system where the maximum vertical load acting on the air spring is significantly reduced.

An even further objective is to provide a vehicle suspension system which utilizes an air spring which operates over a significant larger area than heretofore possible.

Still an even further objective is to provide a vehicle suspension system which may be utilized as both a liftable and non-liftable suspension system.

Still one more objective is to provide a vehicle suspension system which will operate equally well on most vehicles.

An additional objective is to provide such a vehicle suspension system which is of simple construction, which achieves the stated objectives in a simple, effective and inexpensive manner, and which solves problems and satisfies needs existing in the art.

These and other objectives and advantages of the invention are obtained by the improved suspension system adapted to be mounted to a vehicle, the general nature of which may be stated as including a suspension frame attached to the vehicle frame, an axle of a first length, a pair of hanger brackets adapted for extending from the suspension frame and for supporting the suspension system, a central beam pivotally attached to the hanger brackets and extending therefrom to the axle, the central beam having a first width substantially the same as the first length, a support plate securely affixed to the suspension frame, an air spring of substantially the first length and adapted to be positioned intermediate the central beam and the vehicle frame, and a plurality of fasteners affixing the air spring to the support plate.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
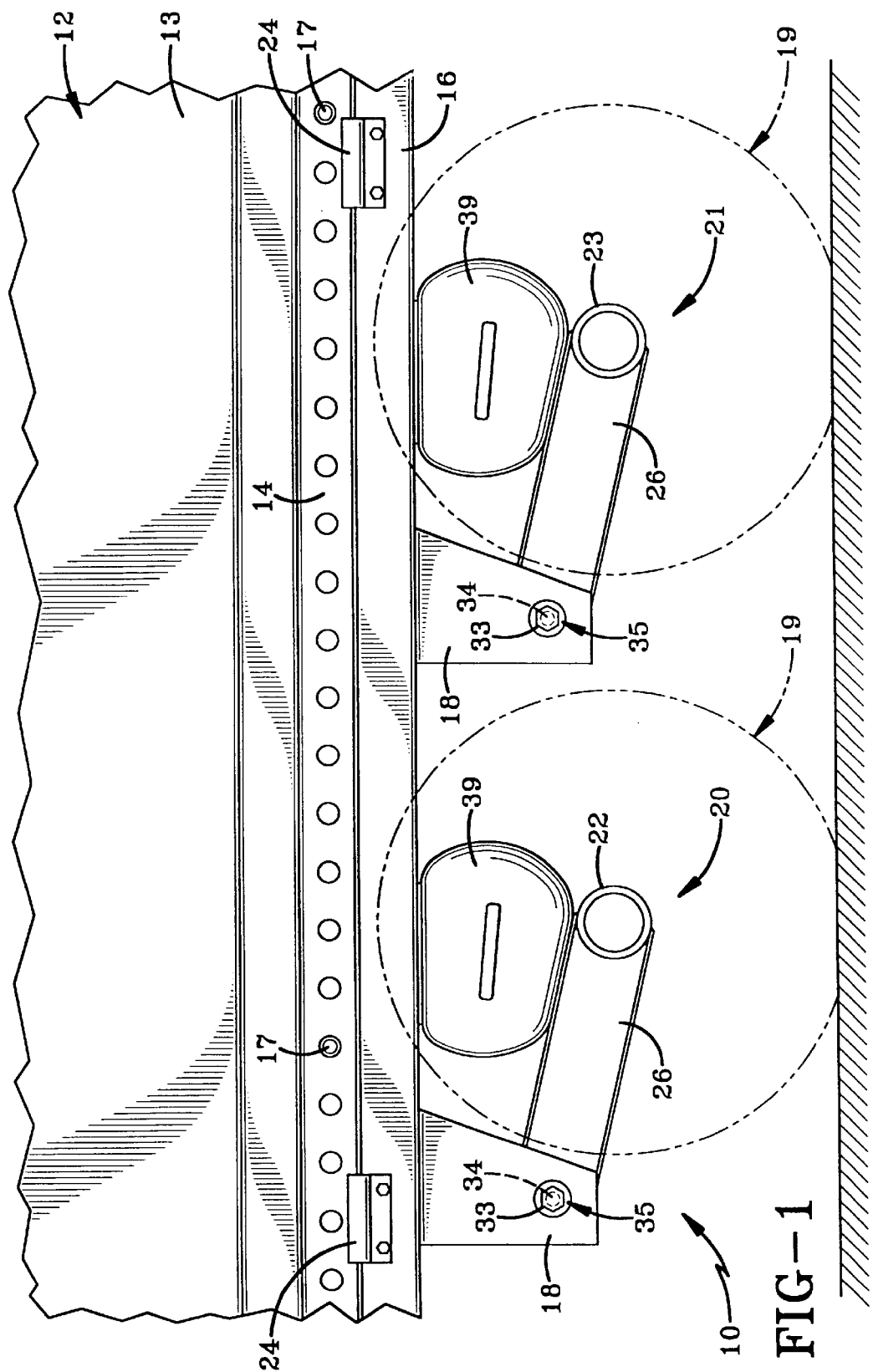
FIG. 1 is a side elevational view of the suspension system of the present invention shown attached to a vehicle and with the tire-wheel assembly shown in dot-dash lines.
Figure 2:
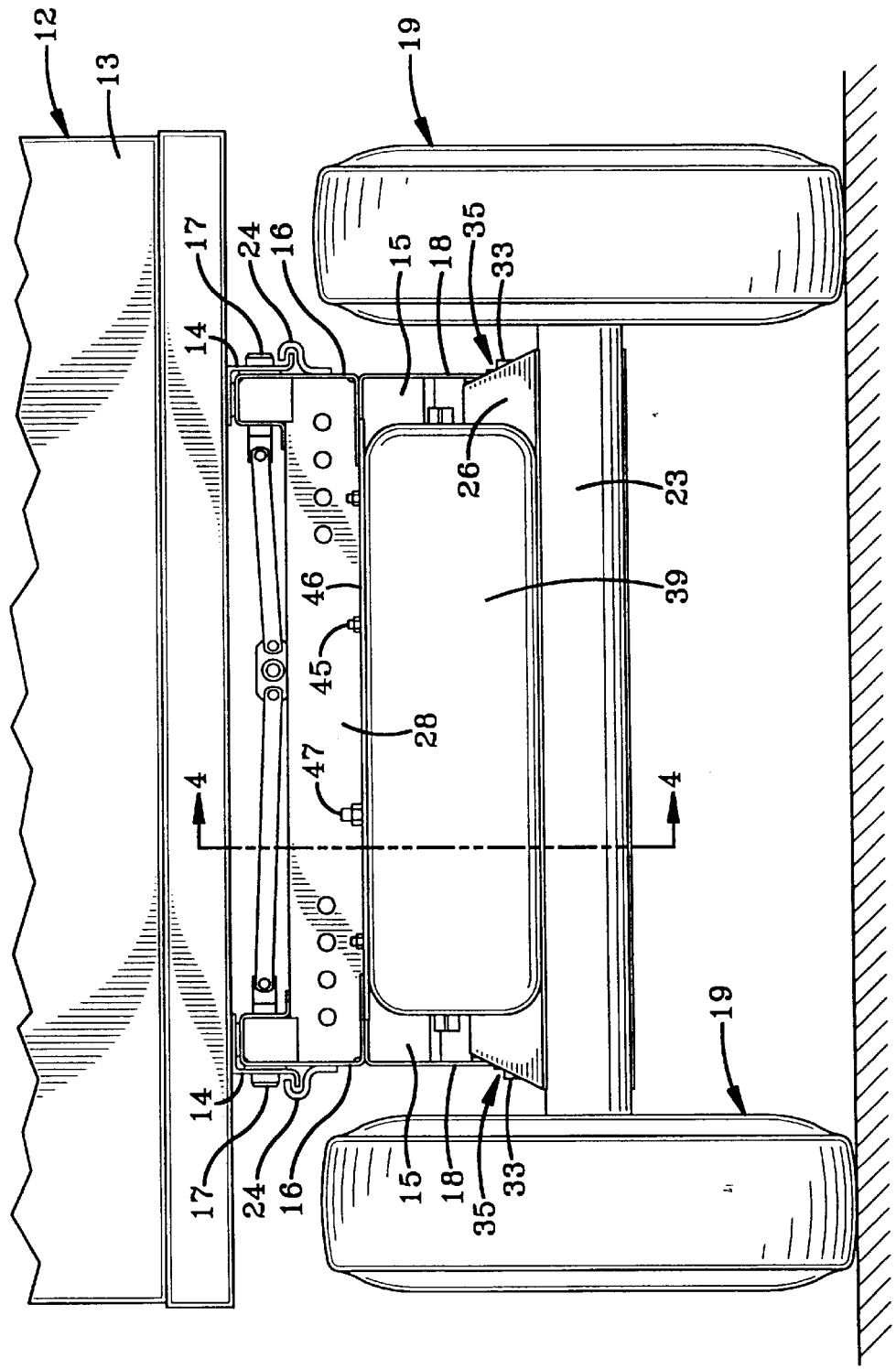
FIG. 2 is a rear end elevational view of the suspension system shown in FIG. 1.

The improved suspension system of the present invention is indicated generally at 10 and is particularly shown in FIGS. 1 and 2 and is adapted to be mounted on a vehicle 12, such as a truck or trailer. Vehicle 12 includes a cargo box 13, flat bed, or other container or surface for hauling goods and materials. The cargo box 13 is supported by a pair of parallel and spaced apart slider rails 14 extending longitudinally beneath vehicle 12.

Suspension system 10 includes one or more suspension frames 15. At least a pair of spaced apart hanger brackets 18 are affixed to each of the suspension frames 15. Each hanger bracket 18 is L-shaped in cross section and welded or otherwise attached to one of a pair of parallel and spaced apart slide channels 16 as shown in FIGS. 1 and 2. Slide channels 16 are C-shaped in cross section and are spaced apart a distance equal or approximately equal to the distance between slider rails 14. Each of the slide channels 16 is adjacently positioned within and mounted to one of the L-shaped slider rails 14 with a plurality of mounting pins 17 as best shown in FIG. 2. One or more safety guides 24 is provided along the outer surface of slide channels 16 opposite the respective slider rail 14 positioned along the inner surface of the respective slide channel.

In the embodiment shown in FIGS. 1–8, a pair of axles 22 and 23 are provided on one portion of the vehicle 12 although the invention is designed such that one or two, or more than two axles may be provided on any portion of the vehicle. As a result of the two axle embodiment, the suspension system 10 comprises a forward suspension 20 and a rearward suspension 21 for supporting the forward axle 22 and the rearward axle 23, respectively, each axle 22 and 23 supports a tire-wheel assembly 19 on the ends thereof. In other embodiments where more or less axles are present, an equal number of suspensions equivalent to forward and rearward suspensions 20 and 21 are provided. Inasmuch as both the forward and rearward suspensions 20 and 21 are similar, only forward suspension 20 will be described in detail. As is clear from FIG. 2, the planar arm 26 essentially provides both a beam attached to the two hanger brackets 18, and a plate which underlies the bladder 39.

Figure 9:
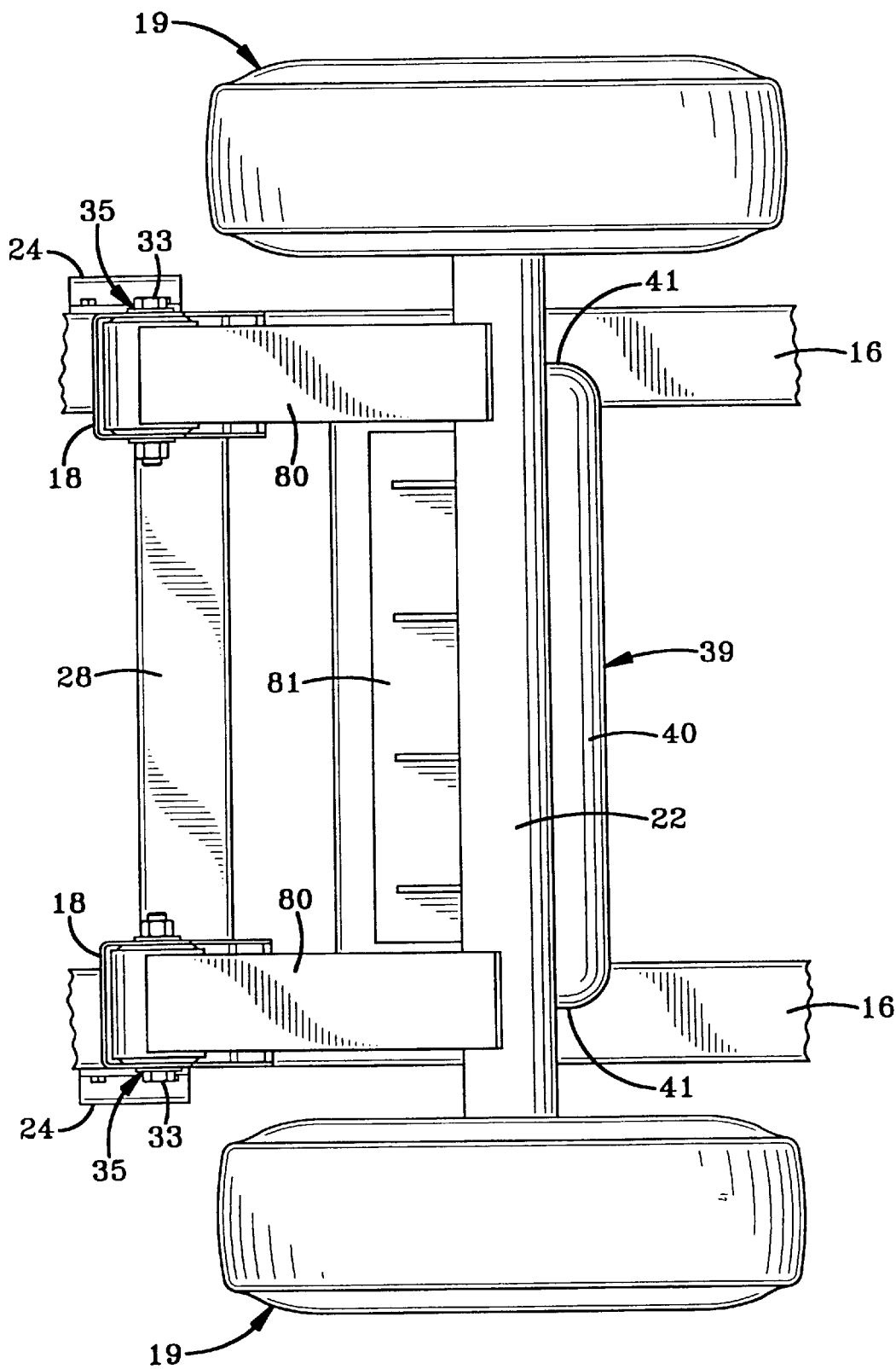
FIG. 9 is a bottom plan view showing an alternative embodiment of the invention with independent trailing beams.

Referring to FIGS. 1–2 and in accordance with one of the features of the invention, forward suspension 20 includes a planar arm or beam 26, and an air bladder 39. Arm 26 is specifically attached to the hanger brackets 18 in a pivotable manner via a pivot pin 33, inserted through one end of the arm and inserted within an axial hole 34 formed in each bracket creating a pivot 35. The opposite end of the arm 26 is rigidly affixed to its respective axle 22 approximate the ends of the axle and adjacent the tire-wheel assemblies 19 which are affixed to each end of each axle. Pivot 35 may be a single pivot centrally positioned between the hanger brackets which pivot would likely have the length and range of from 10 to 30 inches. Alternativley, two pivots 35 may be provided in an alternative suspension Utilizing a pair of trailing or leading beams such as shown in FIG. 9. While bladder 39 may take a variety of forms and configurations, it preferably as a length at least twice its width, which length corresponds to a distance of between 25% to 70% of the length of the axle. This length would normally range between 15 to 50 inches depending on the suspension size and configuration. Still further, inasmuch as bladder 39 is manufactured with a closed side wall with a pair of end walls to close the side wall bladder 39 is free of internal pistons which pistons substantially increase costs in traditional air bladder technology. As is clear, the air bladder 39 extends substantially the distance between the right and left hand hanger brackets.

At least one mounting or support beam 28 extends between slide channels 16. The beams 28 are affixed and extend between the slide channels 16 while the L-shaped brackets 18 are attached thereto as best shown in FIG. 2. Mounting beam 28 provides a rigid, load bearing surface against which air bladder 39 is affixed to and restricted by during vertical loading of the vehicle.

Figure 3:
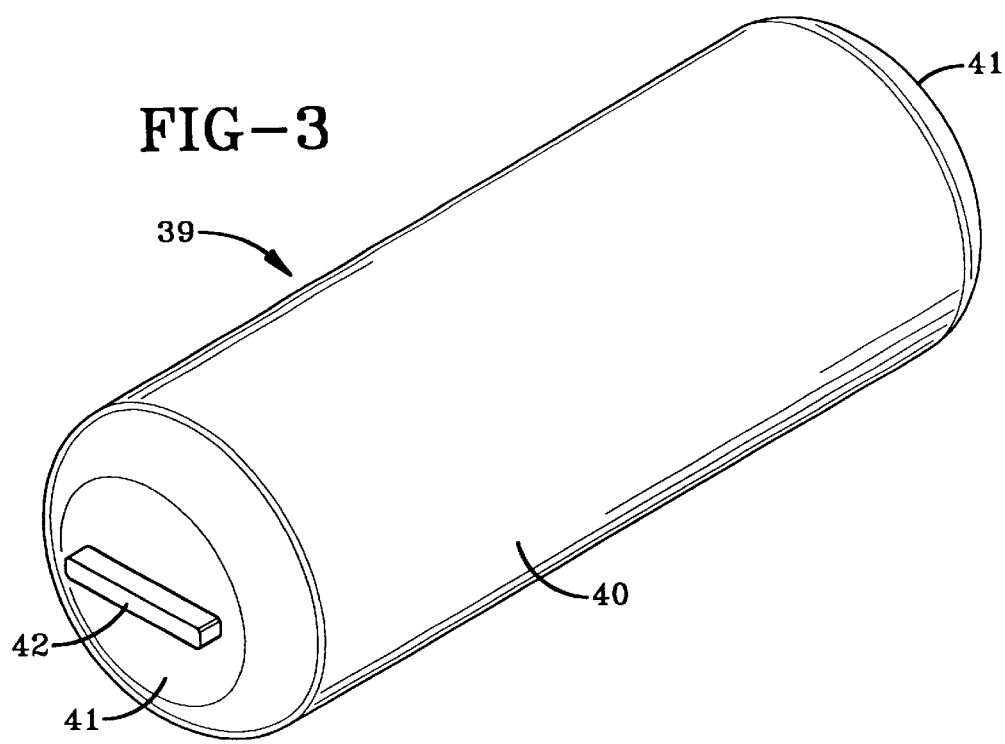
FIG. 3 is an enlarged perspective view of the air bladder of the suspension system shown in FIG. 1.

In accordance with one of the features of the present invention, air bladder 39 is a bladder constructed of a material highly resistant to deformation. The construction of air bladder 39 is best shown in FIG. 3 as a bladder with a cylindrical side wall 40 and a pair of opposing end walls 41 defined by the gathering of the side wall 40 together at each end of the bladder in the form of gathered portion 42. This gathered portion 42 at each end is crimped or otherwise secured together in a manner capable of withstanding not only static pressure but also dynamic pressure as is present during shock absorption. This crimp is manufactured by any of a number of techniques including ultrasonic welding, high pressure compression, or other known crimping techniques.

Figure 4:
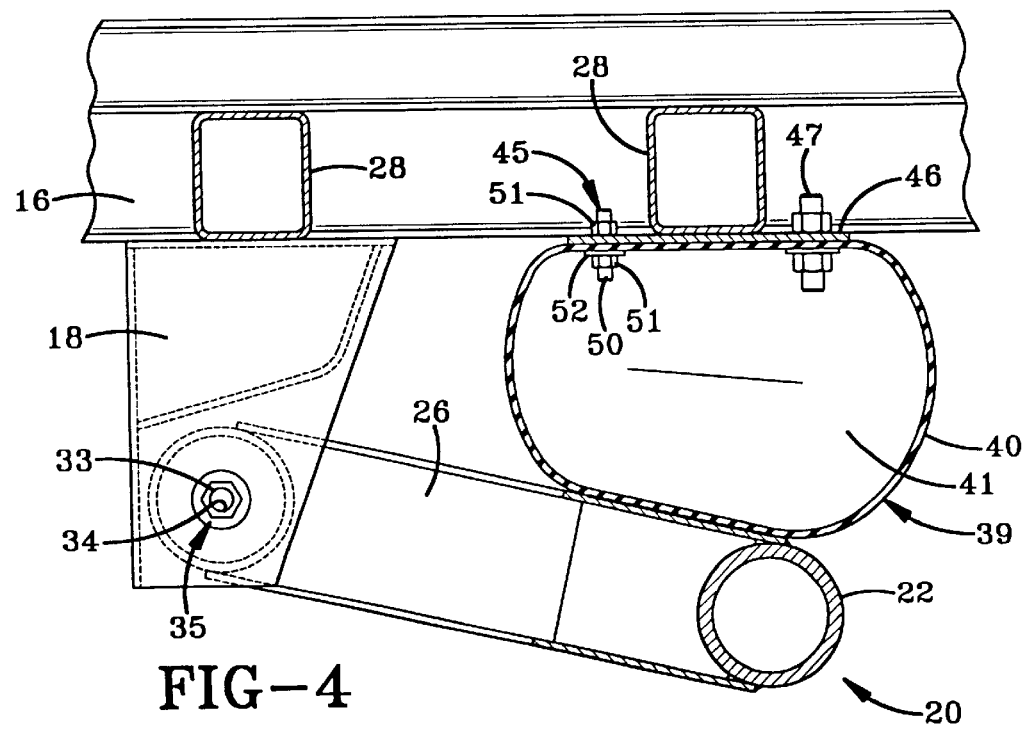
FIG. 4 is a side sectional view of the air bladder, axle, beams, and frame of the suspension system best shown in FIG. 1 with other portions of the system and vehicle the system is on removed and/or cut away.

In accordance with another feature of the invention, air bladder 39 is affixed using a plurality of fasteners 45 to a support plate 46 as shown in FIG. 4. Support plate 46 is in turn welded to mounting beam 28. In the embodiment shown in FIG. 4, support plate 46 provides significantly more surface area against which the air bladder 39 is affixable and against which it is supported. The fasteners tightly secure the bladder to the plate 46.

Generally, at least one of the fasteners 45 would also operate as an air inlet and/or outlet 47. This inlet/outlet may be of any design known in the art in which air or other fluid is selectively added or released such as a standard valve stem as used on tires. This inlet/outlet provides a fluid supply for inflation and deflation of the bladder. This allows for pressure control and thus control of the smoothness or stiffness of the vehicle ride.

Fasteners 45 as shown in FIGS. 4 include a threaded rod 50 with nuts 51 on each end thereof. Preferably, washers 52 are also used to provide additional holding strength and surface area of interaction between the fastener and the bladder.

Figure 5:
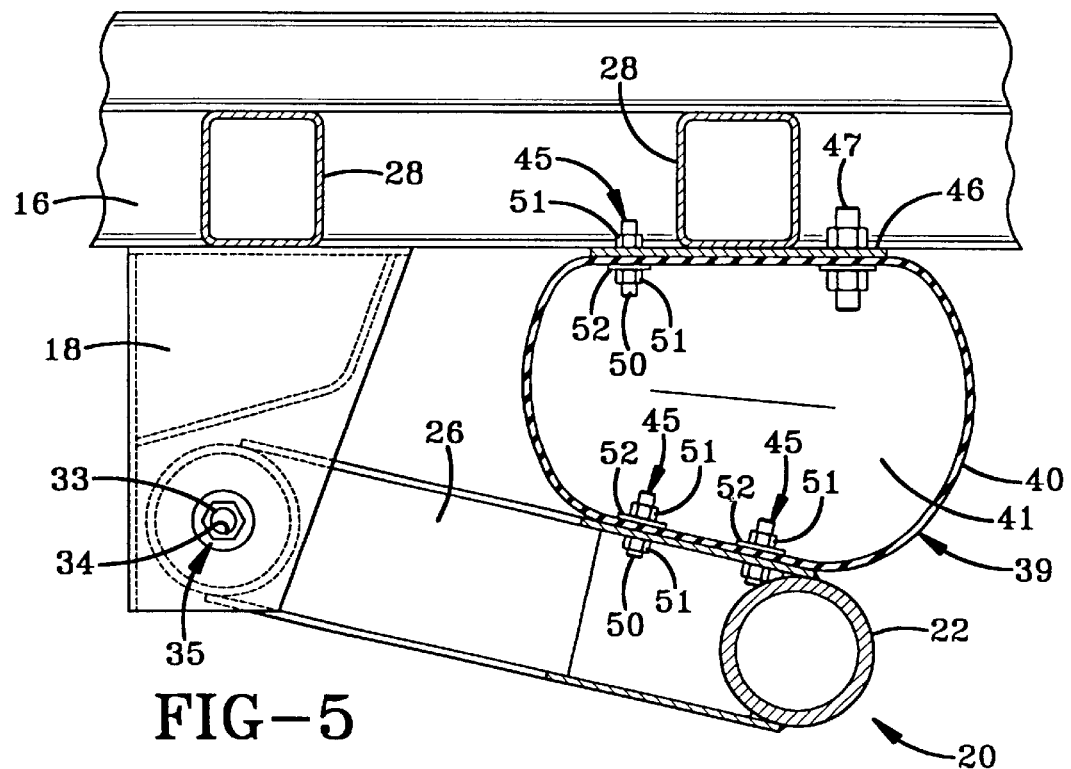
FIG. 5 is a side sectional view of an air bladder, axle, beams, and frame of a second embodiment of a suspension system of the present invention with the same portions removed as were removed in FIG. 4.

In another embodiment as shown in FIG. 5, fasteners 45 are also provided to secure the bladder 39 to the beam 26. In contrast to the embodiment of FIG. 4 where the bladder merely rested upon the beam, the bladder 39 is tightly secured to the beam in the same or a similar manner as it is to the support plate 46. This provides additional protection against the air bladder being squeezed or otherwise moved out of its proper position between the support plate 46 and the beam 26.

Figure 6:
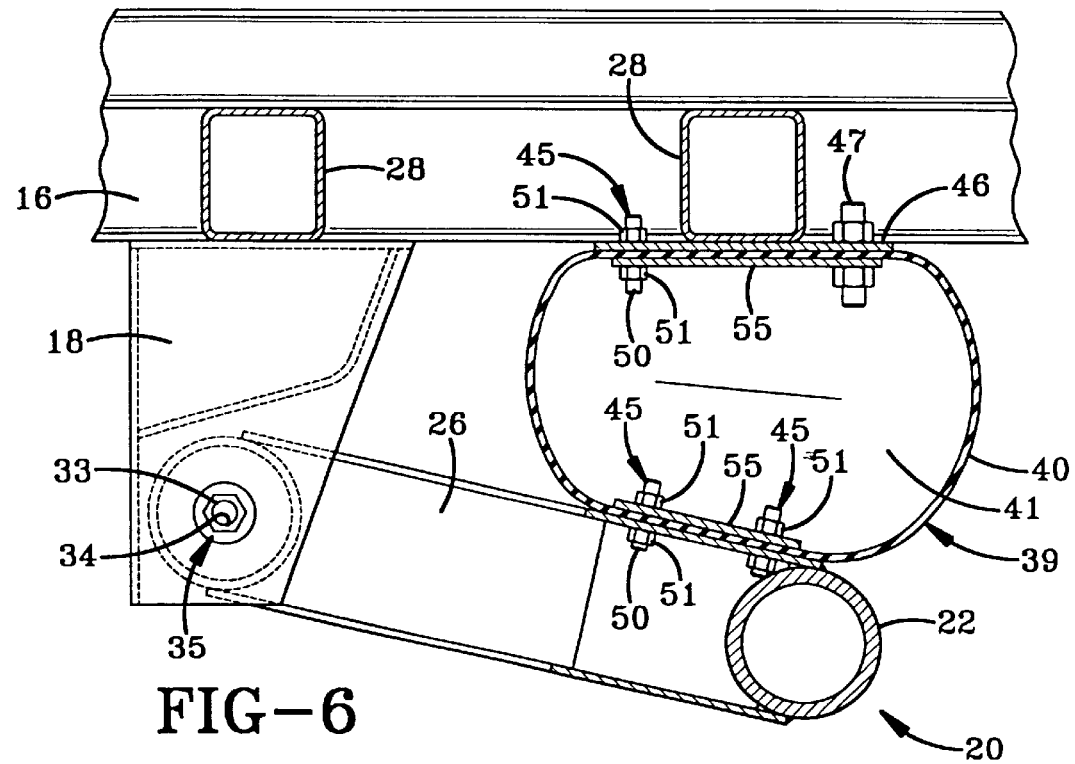
FIG. 6 is a side sectional view of an air bladder, axle, beams, and frame of a third embodiment of a suspension system of the present invention with the same portions removed as were removed in FIGS. 4 and 5.

In an even further embodiment as shown in FIG. 6, a supplemental support plate 55 is provided. This plate 55 is used on the inside of the bladder 39 to sandwich the bladder along its upper side between plates 46 and 55 and/or along its lower side between beam 26 and plate 55. This supplemental support plate 55 provides additional protection against ripping or other degradation of the air bladder as the area of the bladder around the fasteners move while remaining fixed immediately adjacent and under the fasteners.

Still further, bladder 39 may be adhered to support plate 46 and to beam 26 through the use of either glue or epoxy sufficient to withstand the maximum shock load which would be felt by bladder 39 during normal operation without departing from the spirit of the present invention.

Figure 7:
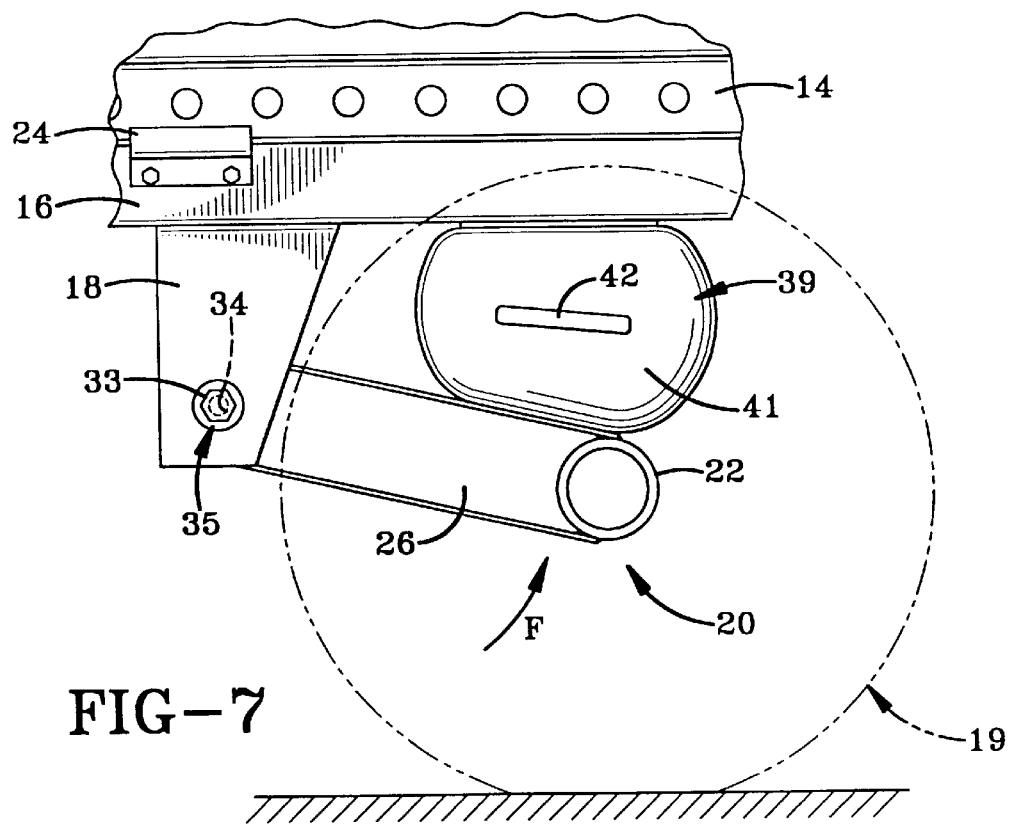
FIG. 7 is a side perspective view of the suspension system of any of the above embodiments in a first operating position.
Figure 8:
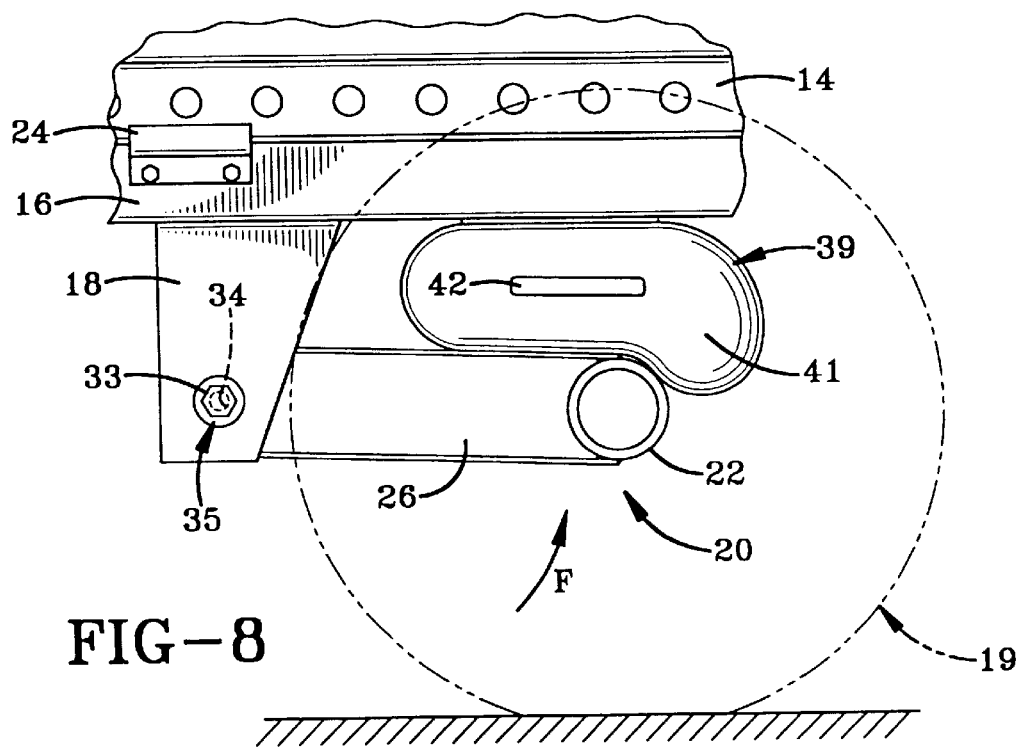
FIG. 8 is a side perspective view of the suspension system of FIG. 7 in a second operating position where a load such as a bump in the road has been encountered.

Operationally, suspension system 10 permits axles 22 and 23 to separately pivot about pivot pins 33 during use and in response to loads inputted into suspension, system 10 through tire-wheel assemblies 19. This pivoting is shown in FIGS. 7 and 8 as a force F. Suspension system 10 maybe installed onto a usual vehicle 12 by positioning hanger brackets 18 against slide channels 16 and welding the same thereto. These slide channels 16 are secured in a manner well known in the art to slide rails 14 via mounting pins 17.

The central beam 26 of each of the forward and rearward suspensions offers roll resistance and lateral stability to suspension system 10 via its welded interconnection with axles 22 and 23 respectively and its bushed interconnection with suspension frame 15 via hangar brackets 18. As can be seen from a review of FIGS. 1–5, suspension system 10 substantially reduces the torque felt by any of the axles 22 and 23 as one of the central beams 26 supports each of the axles 22 and 23 along substantially the entire length thereof. Specifically, roll and lateral forces input into central beam 26 will react at the bushings surrounding the nearest pin 33, transfer into central beam 26, and out of central beam 26 through the bushing surrounding the pin 33 in the opposing hanger. In this manner, a U-shaped roll beam is provided whereby the path of travel of lateral and roll forces input into suspension system 10 does not include axles 22 and 23. As such, the torque on axles 22 and 23 is substantially eliminated. Still further, inasmuch as central beam 26 attaches to axles 22 and 23 along a substantially large portion of its length, the axles 22 and 23 are reinforced.

In another view shown in FIG. 9, two independent trailing beams 80 are provided with a welded plate 81 extending therebetween supporting bladder 39. Again, bladder 39 is positioned adjacent axle 22 for supporting vertical loads.

Still further in operation, bladder 39 as a result of force F, will move from the position in FIG. 7 in static loading, to the position in FIG. 8 during dynamic loading whereby force operates to pass from beam 26 through bladder 39 into the vehicle. When such force happens, bladder 39 will deflect from the position shown in FIG. 7 to the position in FIG. 8 whereby a portion of the bladder extends over the rear of axle 22. In this manner, axle 22 operates as an external piston adjacent the rear end thereof. In this manner, no internal piston is provided for bladder 39 and the cost for bladder 39 is substantially reduced.

In accordance with one of the main features of the invention, one air bladder is provided that longitudinally extends substantially the full length of its respective axle 22. This provides a smoother ride as the forces on the axle are distributed by the air bladder over its entire length. Additionally, more square area is provided by the one air bladder over the entire axle length thereby resulting in a smoother ride as the forces have more area to be distributed over. The plates 46 are welded or otherwise securely attached to its respective beam 28. In effect, the bottom surface area of the beam adjacent the air bladder is substantially increased in area as the plate acts as a rigid extension thereof. As a result, these plates provide significantly greater surface area against which the air bladder is positioned and against which the forces the air bladder encounters are distributed.

Accordingly, the improved suspension system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved suspension system is constructed and used, the characteristics of the construction, and the advantageous; new and useful results obtained; the new and useful structures, devices, elements, arrangements, parts and combinations, are set forth in the appended claims.

What is claimed is:

1. A suspension system adapted to be mounted to a vehicle frame comprising:

a pair of hanger brackets adapted for extending from the vehicle frame with one defining a right side and the other a left side;

an axle of a first length;

at least one beam attached to the hanger brackets, extending between the hanger brackets and the axle and attached to the axle;

at least one pivot for pivotally attaching the beam to each of said hanger brackets;

said at least one beam including a support plate;

an air bladder supported on the support plate and adapted to be positioned intermediate the support plate and the vehicle frame and extending substantially the distance between the right side and the left side;

the air bladder being an elongated body of a highly deformation resistant material, the body having closed ends thereby defining a pressurizable internal cavity;

the air bladder having a length defined in a direction extending between said hanger brackets, and a width, and in which the length has a value substantially greater than the width; and a supplemental plate is positioned within the air bladder and is adapted to secure the air bladder between the supplemental plate and the support plate.

2. A suspension system adapted to be mounted to a vehicle frame comprising:

a pair of hanger brackets adapted for extending from the vehicle frame with one defining a right side and the other a left side;

an axle of a first length;

at least one beam attached to the hanger brackets, extending between the hanger brackets and the axle and attached to the axle;

at least one pivot for pivotally attaching the beam to each of said hanger brackets;

said at least one beam including a support plate;

an air bladder supported on the support plate and adapted to be positioned intermediate the support plate and the vehicle frame and extending substantially the distance between the right side and the left side;

the air bladder being an elongated body of a highly deformation resistant material, the body having closed ends thereby defining a pressurizable internal cavity;

the air bladder having a length defined in a direction extending between said hanger brackets, and a width, and in which the length has a value substantially greater than the width; and supplemental plates are positioned within the air bladder and are adapted to secure the air bladder to the support plate and the vehicle frame.

* * * * *